United States Patent [19]

Isaka

[11] Patent Number: 5,794,587
[45] Date of Patent: *Aug. 18, 1998

[54] TUMBLE VALVE FOR MULTI-VALVE ENGINE

[75] Inventor: Yoshiharu Isaka, Iwata, Japan

[73] Assignee: Yamaha Hatsudoki Kabushiki Kaisha, Iwata, Japan

[*] Notice: The term of this patent shall not extend beyond the expiration date of Pat. No. 5,487,365.

[21] Appl. No.: 458,461

[22] Filed: Jun. 2, 1995

[30] Foreign Application Priority Data

Jun. 14, 1994 [JP] Japan ................. 6-131828

[51] Int. Cl.$^6$ .................. F02B 31/00; F02M 35/10
[52] U.S. Cl. ........................ 123/308; 123/432
[58] Field of Search .................. 123/308, 342, 123/195 H, 193.5, 306

[56] References Cited

U.S. PATENT DOCUMENTS

| | | | |
|---|---|---|---|
| 1,727,265 | 3/1929 | Aseltine | 261/41.3 |
| 3,318,292 | 5/1967 | Hideg | 123/308 |
| 3,408,992 | 11/1968 | Seggern et al. | 123/188.14 |
| 4,105,577 | 8/1978 | Yamashita | 252/300 |
| 4,174,686 | 11/1979 | Shimizu et al. | 123/308 |
| 4,228,772 | 10/1980 | Bakonyi | 123/403 |
| 4,240,387 | 12/1980 | Motosugi et al. | 123/184.56 |
| 4,256,062 | 3/1981 | Schafer | 123/184.56 |
| 4,269,153 | 5/1981 | Kunii et al. | 123/308 |
| 4,308,830 | 1/1982 | Yamada et al. | 123/188.14 |
| 4,320,725 | 3/1982 | Rychlik et al. | 123/308 |
| 4,354,463 | 10/1982 | Otani et al. | 123/308 |
| 4,371,438 | 2/1983 | Yagi et al. | 123/432 |
| 4,413,598 | 11/1983 | Tsutsumi | 123/306 |
| 4,428,334 | 1/1984 | Klomp | 123/188.14 |
| 4,452,218 | 6/1984 | Yokoyama et al. | 123/579 |
| 4,499,868 | 2/1985 | Kanda et al. | 123/188.14 |
| 4,543,931 | 10/1985 | Hitomi et al. | 123/308 |
| 4,663,938 | 5/1987 | Colgate | 60/620 |

(List continued on next page.)

FOREIGN PATENT DOCUMENTS

| | | |
|---|---|---|
| 0054964 | 6/1982 | European Pat. Off. . |
| 0068481 | 1/1983 | European Pat. Off. . |
| 0074202 | 3/1983 | European Pat. Off. . |
| 0076632 | 4/1983 | European Pat. Off. . |
| 0221312 | 5/1987 | European Pat. Off. . |
| 0235288 | 9/1987 | European Pat. Off. . |
| 449240 | 3/1991 | European Pat. Off. . |
| 2569227 | 8/1986 | France . |
| 2709519 | 9/1977 | Germany . |
| 3429414 | 2/1985 | Germany . |
| 3638021 | 5/1987 | Germany . |
| 51-54007 | 12/1976 | Japan . |
| 56-43428 | 4/1981 | Japan . |
| 56-139829 | 10/1981 | Japan . |
| 59-5767 | 2/1984 | Japan . |
| 59-120718 | 4/1984 | Japan . |
| 60-11206 | 3/1985 | Japan . |

(List continued on next page.)

OTHER PUBLICATIONS

European Search Report dated Oct. 5, 1992 w/Patent Abstract.
European Search Report dated Nov. 23, 1992 w/Patent Abstract.

*Primary Examiner*—Willis R. Wolfe
*Assistant Examiner*—Hieu T. Vo
*Attorney, Agent, or Firm*—Knobbe, Martens, Olson & Bear LLP

[57] ABSTRACT

A number of embodiments of induction systems for three-intake-valve-per-cylinder internal combustion engines, wherein the intake valves and the flow passages serving them are disposed so as to generate a tumble motion in the inducted intake charge. A number of embodiments of control valves are provided for redirecting the flow and increasing the tumble action under low-speed, low-load conditions. The control valve in each embodiment is journaled in the cylinder head at a position outwardly of the fasteners which secure the cylinder head to the cylinder block, but still quite close to the valve seats so as to provide maximum turbulence generation.

20 Claims, 12 Drawing Sheets

U.S. PATENT DOCUMENTS

| | | | |
|---|---|---|---|
| 4,669,434 | 6/1987 | Okumura et al. | 123/308 |
| 4,700,669 | 10/1987 | Sakurai et al. | 123/188.14 |
| 4,704,996 | 11/1987 | Morikawa | 123/188.14 |
| 4,714,063 | 12/1987 | Oda et al. | 123/308 |
| 4,719,886 | 1/1988 | Kotani et al. | 123/308 |
| 4,753,200 | 6/1988 | Kawamura et al. | 123/188.14 |
| 4,762,102 | 8/1988 | Kanda | 123/188.14 |
| 4,779,594 | 10/1988 | Oda et al. | 123/432 |
| 4,826,561 | 5/1989 | Tsutsumi | 123/432 |
| 4,827,883 | 5/1989 | Khalighi et al. | 123/308 |
| 4,834,035 | 5/1989 | Shimada et al. | 123/188.14 |
| 4,930,468 | 6/1990 | Stockhausen | 123/188.14 |
| 4,974,566 | 12/1990 | LoRusso et al. | 123/308 |
| 4,995,359 | 2/1991 | Yokoyama et al. | 123/188.14 |
| 4,998,518 | 3/1991 | Mitsumoto | 123/306 |
| 5,435,281 | 7/1995 | Regueiro | 123/195 |
| 5,487,365 | 1/1996 | Isaka | 123/306 |
| 5,555,869 | 9/1996 | Uchida | 123/308 |

FOREIGN PATENT DOCUMENTS

| | | |
|---|---|---|
| 61-12940 | 1/1986 | Japan . |
| 61-28715 | 2/1986 | Japan . |
| 61-144223 | 9/1986 | Japan . |
| 63-32122 | 2/1988 | Japan . |
| 63-73532 | 2/1988 | Japan . |
| 63-73534 | 5/1988 | Japan . |
| 2115922 | 9/1990 | Japan . |
| 2230920 | 9/1990 | Japan . |
| 60523 | 2/1948 | Netherlands . |
| 652671 | 5/1951 | United Kingdom . |
| 1135482 | 12/1968 | United Kingdom . |
| 1293772 | of 1972 | United Kingdom . |
| 1457152 | of 1976 | United Kingdom . |
| 2016081 | 9/1979 | United Kingdom . |
| 2027796 | 2/1980 | United Kingdom . |
| 2064646 | 6/1981 | United Kingdom . |
| 2079763 | 1/1982 | United Kingdom . |
| 2087480 | 5/1982 | United Kingdom . |
| 2107780 | 5/1983 | United Kingdom . |
| 2196386 | 4/1988 | United Kingdom . |
| 2196388 | 4/1988 | United Kingdom . |
| 2242226 | 9/1991 | United Kingdom . |
| 7900501 | 8/1979 | WIPO . |
| 9114858 | 10/1991 | WIPO . |

TUMBLE VALVE FOR MULTI-VALVE ENGINE

BACKGROUND OF THE INVENTION

This invention relates to a multi-valve engine and more particularly to an improved induction system for such an engine and a control valve arrangement therefor.

With the growing demand for increased performance and improved efficiency for internal combustion engines it has been proposed to employ a system that employs five valves per cylinder. Such five-valve arrangements normally employ three intake valves and two exhaust valves for each cylinder of the engine. In conjunction with the use of multiple intake valves, although the use of more valves per cylinder gives rise generally to increased flow areas without significantly is increased inertia to the valve mechanism, the placement of the valves also requires a compact construction so as to maintain a low combustion chamber volume, low surface area and high compression ratios. In addition, the intake system which serves the intake valve should be configured so as to permit relatively smooth unencumbered flow into the combustion chamber under at least high-speed, high-load conditions to improve volumetric efficiency.

However, engines that provide relatively unencumbered ingress to the intake air also generally result in poor low-speed performance. The reason for this is that the charge which enters the combustion chamber at low speeds travels at a relatively low velocity due to the large flow area. This means that there is substantially no turbulence in the combustion chamber and, under low-speed conditions, this is not desirable.

It is, therefore, a principle object of this invention to provide an improved induction system for a multi-valve engine wherein the induction system is configured so as to permit the smooth flow of the charge into the combustion chamber under high-speed, high-load conditions but also so as to provide turbulence under low-speed, low-load conditions for more rapid flame propagation.

One way in which the provision of both high flow areas and also high velocity at slow speeds can be accomplished is by providing a control valve in the induction system. The control valve may be movable between a high-speed, high-load condition wherein the flow to the combustion chamber is unencumbered and a restricted low-speed, low-load condition wherein the flow is restricted and, if desired, redirected so as to generate turbulence in the combustion chamber. Although the advantages of this concept are recognized, it has been difficult to apply it in existing engines. In an existing engine, the control valve may be positioned in a valve body that is mounted to a side of the cylinder head. However, if this modification is made to a conventional engine construction, the control valve may be positioned so far from the combustion chamber and valve seats, that it is not as effective as desired in achieving its result.

It is, therefore, a still further object of this invention to provide an improved control valve and cylinder head arrangement for an engine that permits utilization with existing engines and wherein the control valve still will be effective when in its control valve position.

SUMMARY OF THE INVENTION

Features of this invention are adapted to be embodied in an internal combustion engine having a combustion chamber that is defined in part by a cylinder head and a cylinder block

2 to which the cylinder head is affixed. The cylinder head is formed with three intake valve seats which are comprised of a pair of side intake valve seats that are disposed so as to be positioned contiguous to a plane containing the axis of the cylinder bore and extending parallel to the engine crankshaft. A third, center intake valve seat is spaced further from this plane than the side intake valve seats. Intake passage means supply at least air charge to the combustion chamber through the valve seats.

In accordance with a first feature of the invention, the side intake valve seats and the portion of the intake passage means which serves them is generated so as to direct the charge entering the combustion chamber through the side intake valve seats toward the side of the combustion chamber on the other side of the plane and at a point that is disposed well above the head of the piston when in its bottom dead center position.

In accordance with another feature of the invention, the means that affix the cylinder head to the cylinder block comprises a pair of fastening means disposed on the one side of the plane. A control valve is rotatably supported within the cylinder head and is disposed further from the plane than the fastening means. The control valve is movable between a first position wherein the charge entering the combustion chamber is substantially uninterrupted and a second position wherein the flow to the combustion chamber through the intake passage means is restricted and redirected for increasing turbulence in the combustion chamber.

DETAILED DESCRIPTION OF THE PREFERRED EMBODIMENT

Referring now in detail to the drawings and initially to the embodiment of FIGS. 1–5, an internal combustion engine constructed in accordance with this embodiment is identified generally by the reference numeral 21. Since the invention deals primarily with the cylinder head construction and intake passage and control system for the engine 21, the engine 21 is shown only partially. In addition, although only a single cylinder of the engine is depicted, it should be readily apparent to those skilled in the art how the invention may be employed with engines having multiple cylinders and also engines having various cylinder configurations. That is, the invention may be employed with engines of the V- or opposed-type as well as in-line engines.

The engine 21 is comprised of a cylinder block 22 which has one or more cylinder bores 23 formed therein. Pistons (not shown) reciprocate in the cylinder bores 23 and are connected in any well known manner to a crankshaft. The crankshaft rotates about an axis that is disposed perpendicular to the plane of FIGS. 1 and 2.

A cylinder head 24 is affixed to the cylinder block 22 by means of threaded fasteners 25. The threaded fasteners 25 comprise pairs of threaded fasteners each disposed on opposite sides of a plane 26 that contains the axis of the cylinder bore 23 and which extends parallel to or contains the axis of rotation of the aforenoted crankshaft. Where the engine is provided with multiple cylinders that are in line, the threaded fasteners 25 between adjacent cylinders serve to hold the cylinder head 24 to the cylinder block 22 therebetween. That is, there are only provided preferably two threaded fasteners between adjacent cylinders with these threaded fasteners serving the purpose of holding the cylinder head 24 in place for each cylinder.

The cylinder head 24 has a lower surface 26 that is maintained in sealing engagement with either the upper face of the cylinder block 22 or with a cylinder head gasket that is interposed therebetween. Inwardly of the surface 26, there are provided recesses 27 which cooperate with the cylinder bore 23 and the heads of the pistons so as to form the combustion chamber to the engine. The configuration is such that when the pistons are at their top dead center position the combustion chamber has a generally lens shape.

Figure 1:
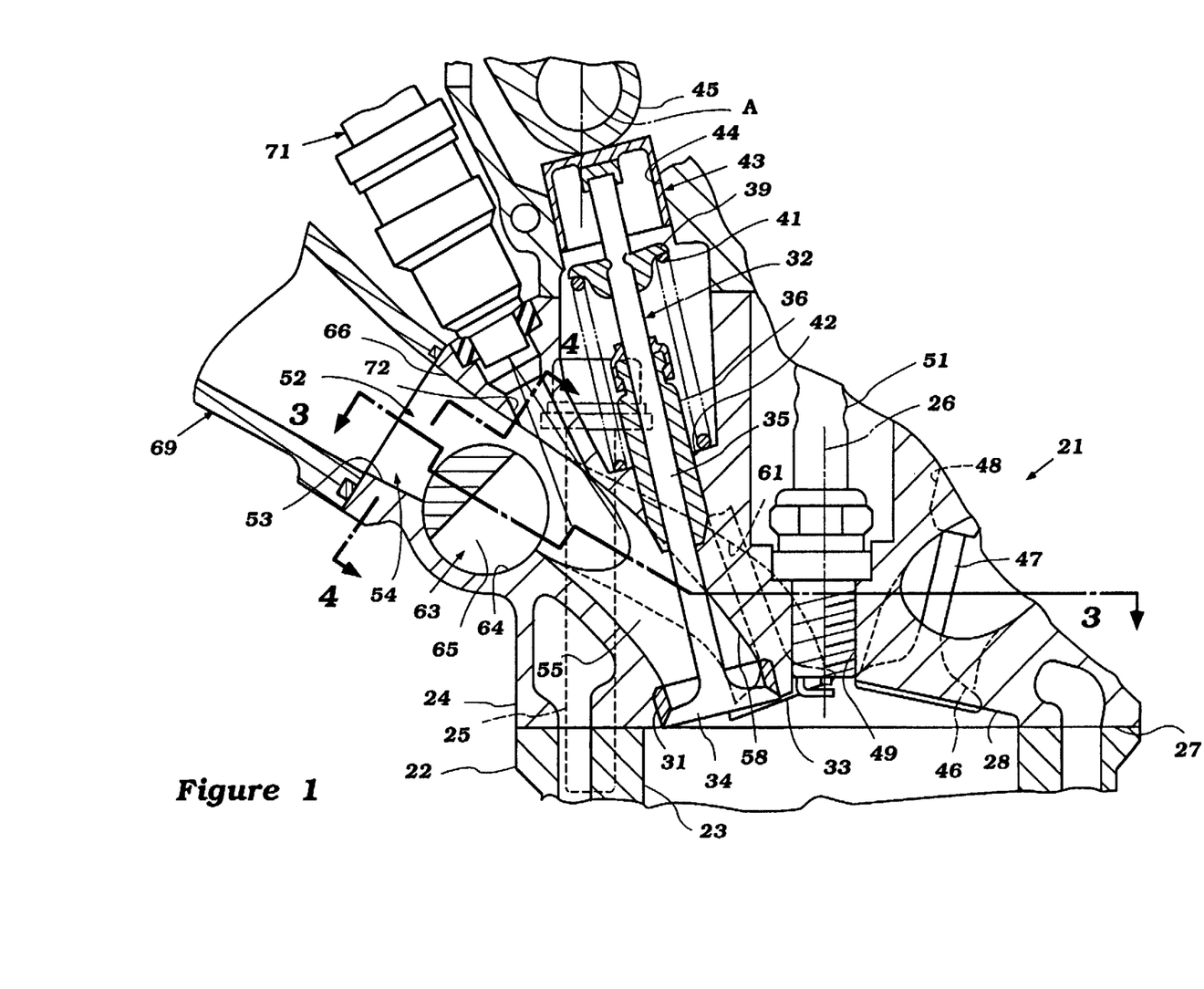
FIG. 1 is a partial cross-sectional view taken through a single cylinder of an internal combustion engine constructed in accordance with a first embodiment of the invention and shows the flow control valve in its low-speed, flow controlling position and is taken generally along the line 1—1 of FIG. 3.
Figure 2:
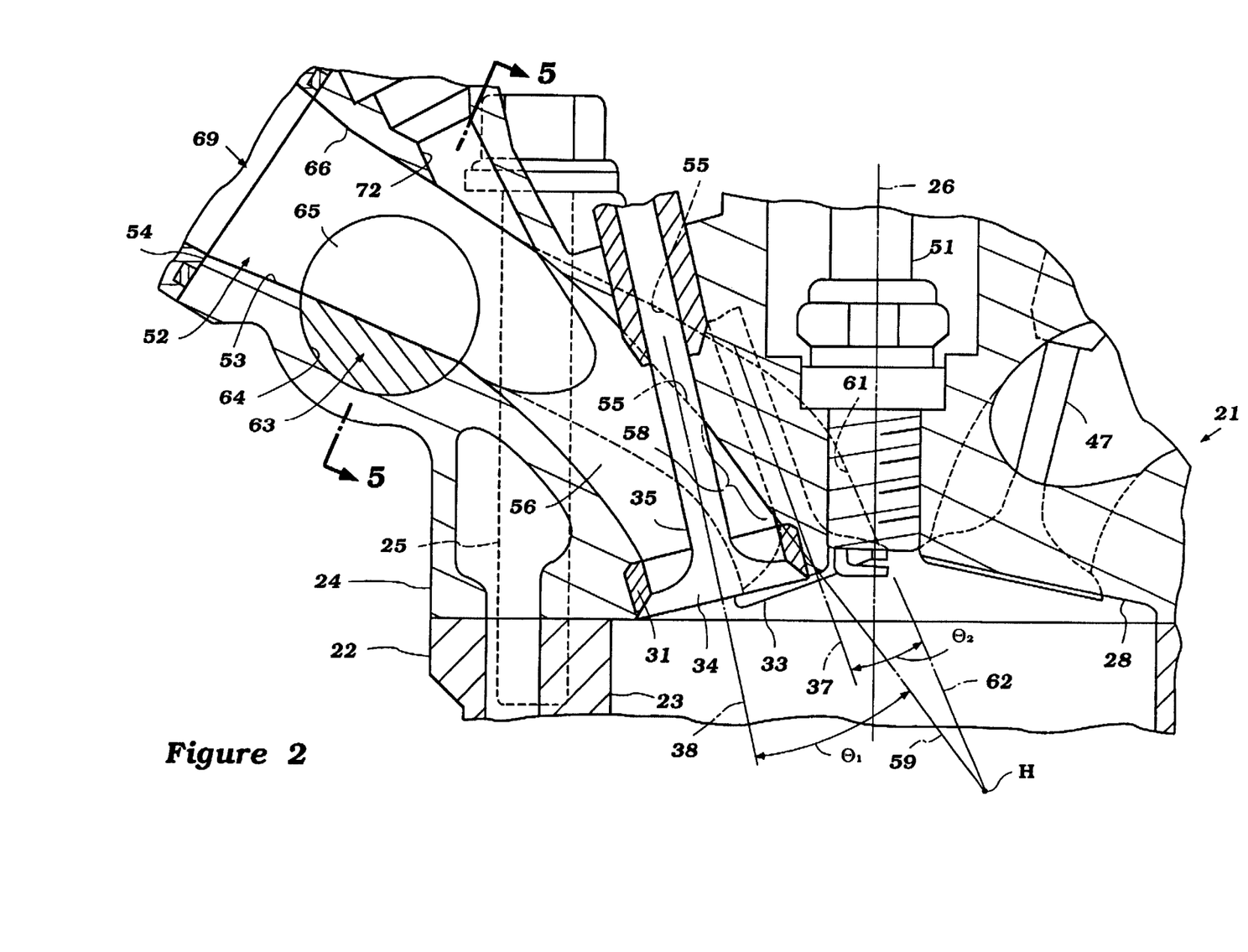
FIG. 2 is an enlarged cross-sectional view in part similar to FIG. 1, but shows the control valve in its open high-speed, high-load position.

A pair of side intake valve seats 29 are formed in the cylinder head recesses 28 by pressed in inserts or the like. These side valve seats 29 are disposed so as to be contiguous to the plane 26. In a preferred embodiment of the invention, the valve seat 29 may extend at least in part over the plane 26 from the intake or left-hand side of the engine as shown in FIGS. 1 and 2 toward the exhaust or right-hand side thereof.

A center intake valve seat 31 is formed by a pressed or cast-in valve seat and is disposed between the side intake valve seats 29 and further from the plane 26. In the illustrated embodiment, the valve seats 29 and 31 all have the same diameter, but it will be readily apparent to those skilled in the art how the invention may be employed with engines wherein the valve seats have different diameters, either from each other or one from the others.

Poppet-type intake valves, indicated generally by the reference numerals 32, have respective head portions 33 and 34 that cooperate with the valve seats 29 and 31, respectively, to control the flow therethrough. These valves 32 have stem portions 35 that are slidably supported within valve guides 36 affixed in the cylinder head 24 in a known manner. Although variations in position are possible, in a preferred relationship, the stems 35 of the side intake valves 32 have their axes of reciprocation lying in a common plane that is disposed at an acute angle to the plane 26. These axes may be disposed in a skewed relationship to each other in the plane in which they lie.

The center intake valve 32 also reciprocates about an axis that is disposed in a plane that lies at an acute angle to the plane 26. This acute angle is less than that defined by the plane in which the side intake valves 32 reciprocate.

The plane about which the side intake valves 32 reciprocate is shown by the line 37 in FIG. 2, and this line also represents the actual axis of the respective side intake valves 32. In a similar manner, the axis of reciprocation of the center intake valve 32 is indicated by the line 38 in FIG. 2.

Keeper retainer assemblies 39 are affixed to the upper ends of the valve stems 35. Coil compression springs 41 are engaged with the keeper retainer assemblies 39 and machined surfaces 42 of the cylinder head 24 for urging each of the intake valves 32 to their closed positions.

A thimble-type tappet 43 is supported in a cylinder head bore 44 around each of the valve axes 37 and 38 for engaging the respective valve stem 35. An intake camshaft 45 is journaled for rotation in the cylinder head 24 about an axis that lies in a plane A that extends parallel to the cylinder bore containing plane 26 and also to the axis of rotation of the crankshaft. The plane A is disposed outwardly of the cylinder bores 23 and toward the outer peripheral edges of the intake side cylinder head fasteners 25. The intake camshaft 45 is driven at one-half crankshaft speed by any suitable drive mechanism.

A pair of exhaust valve seats 46 are formed on the side of the cylinder head 24 opposite the bulk of the intake valve seats 29 and 31. Poppet-type exhaust valves 47 are slidably supported by valve guides 48 and control the flow through the exhaust valve seats 46. The exhaust valves 47 reciprocate about axes that lie in a common plane which is disposed at an angle that is equal to or greater than the angle of the plane 37 of the side intake valves. Since the invention deals primarily with the induction side of the cylinder head 24, a further description of the exhaust side is not believed to be necessary to permit those skilled in the art to practice the invention.

Like the intake valves 32, the exhaust valves 47 are urged toward their closed positions by a suitable spring and keeper arrangement and are actuated by an exhaust camshaft, none of which structure appears in the figures, but which can be of any conventional type.

The cylinder head 24 is formed with tapped spark plug receiving holes 49 that are disposed substantially on the cylinder bore axis within the plane 26 and which receive spark plugs 51 for igniting the combustible charge which is delivered to the combustion chambers, including the recesses 28, through the induction system, which will now be described.

The induction system includes a cylinder head intake passage, indicated generally by the reference numeral 52, which has an inlet opening 53 formed in an outer face 54 of the cylinder head 24. Downstream of the inlet opening 53, the passage 52 divides into a pair of side branch passages 55 which extend to the side valve seats 29. Between the side branch passage portions 55, there is provided a central portion 56 that is divided from the side portions 55 by walls 57. Hence, the intake passage 52 is of the Siamese type, in that it has one inlet opening that serves the three outlet openings defined by the valve seats 29 and 31.

As may be best seen from FIG. 2, the side intake branches 56 have an outer wall portion 58 that extends toward the side of the side valve seats 29 closest to the plane 26 and which lie in a line 59 that is disposed at an angle $\theta_1$ to the plane 38 containing the reciprocal axes of these side intake valves 34. This angle is relatively wide and directs the flow toward a point H which is disposed well above the bottom dead center position of the piston.

In a somewhat similar manner, the side intake passages 55 have their outer walls 61 disposed so as to define a tangent line 62 that is disposed at an angle $\theta_2$ than the plane 37 containing their reciprocal axes. The line 62 defines a plane that intersects the plane 59 at the point H. Hence, the intake charge will be delivered to this point and across the plane 26 on the exhaust side of the combustion chamber so as to generate a tumble action. As the speed of the engine increases, however, this tumble action will be somewhat dissipated due to the large flow volume, but nevertheless, there will be achieved the desired degree of turbulence in the combustion chamber, even at high engine speeds and lows. However, this turbulence is not generated in such a way so as to significantly increase the volumetric efficiency of the engine 21 or its high-speed power output.

In order to further augment the turbulence, and specifically the tumble action, particularly at lower speed and lower load conditions, there is provided in the induction passage 52, and specifically the common portion of it, upstream from the walls 57, a control valve, indicated generally by the reference numeral 63. The control valve 63 is a generally cylindrical valve element that is rotatably journaled within a bore 64 formed in the cylinder head 24 transversely outwardly from the fasteners 25. Hence, the valve 63 is positioned close to the valve seats 29, and specifically to the dividing walls 57, but far enough away so as to not interfere with the fasteners 25.

Figure 5:
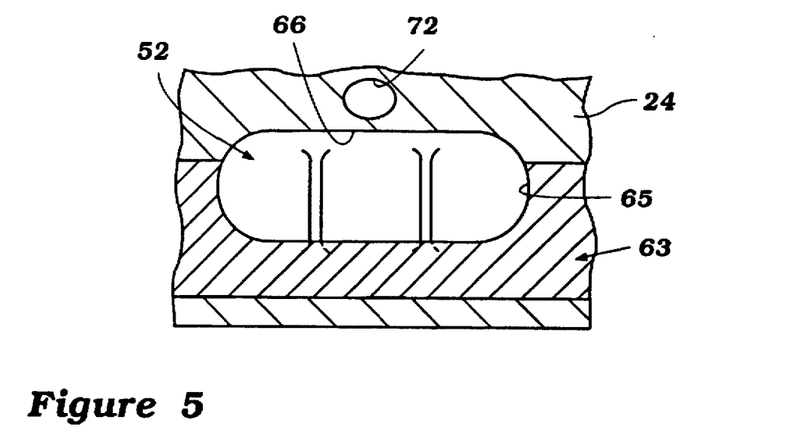
FIG. 5 is a cross-sectional view, in part similar to FIG. 4, but taken along the line 5—5 of FIG. 2 and showing the flow controlling valve in its opened high-speed condition.

The control valve 63 is provided with a cutout portion 65 which, when the control valve 63 is in its wide open, full throttle position, as shown in FIGS. 2 and 5, will be clear of the flow passage 52 and, accordingly, the flow to the intake valve seats 29 and 31 is substantially unrestricted and unencumbered. In this position, the upper wall portion 66 of the flow passage 52 is substantially unrestricted.

Figure 3:
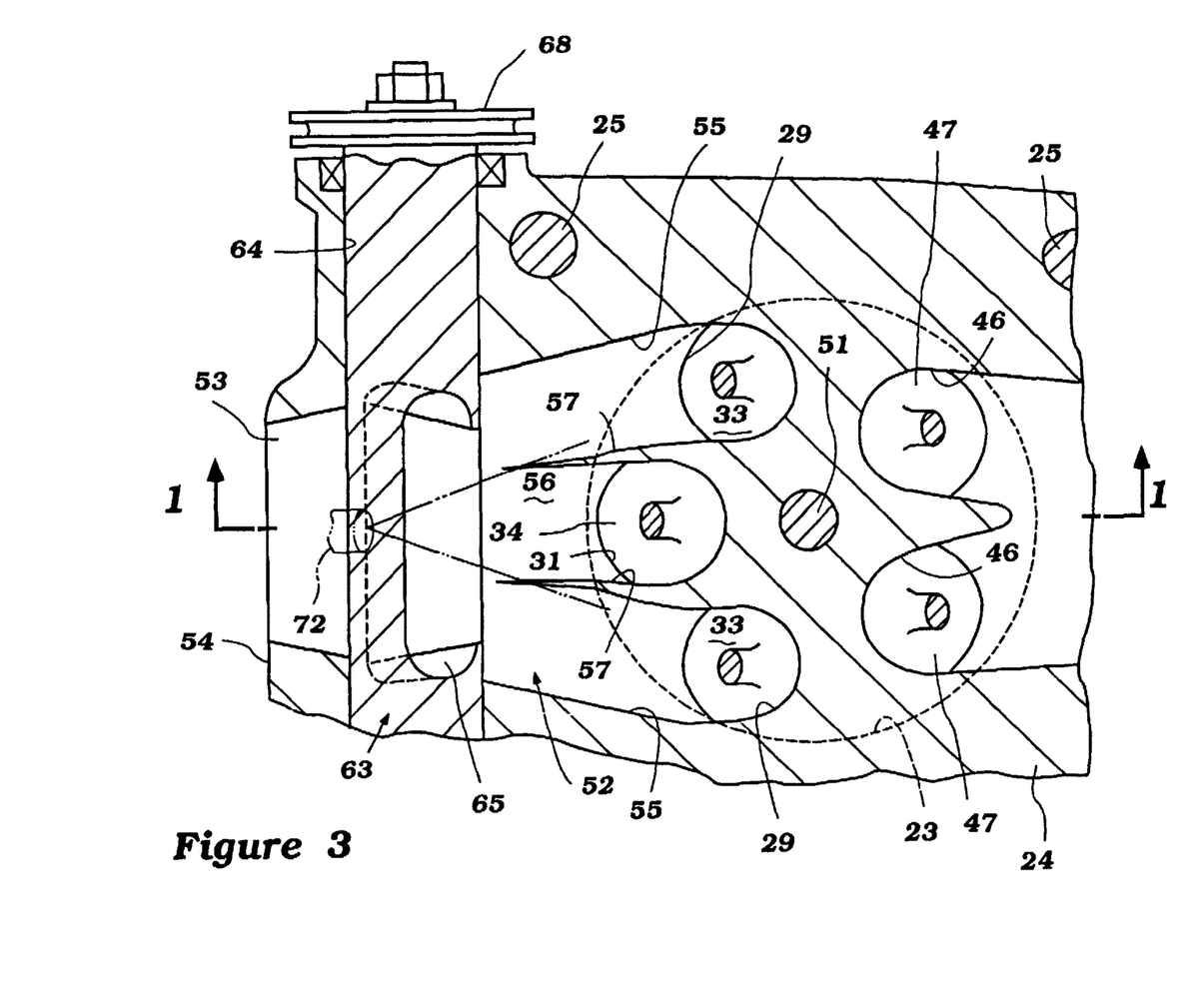
FIG. 3 is a cross-sectional view taken along the line 3—3 of FIG. 1.
Figure 4:
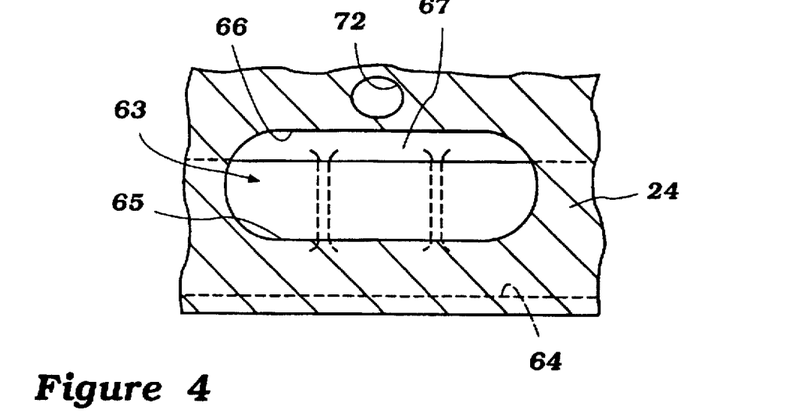
FIG. 4 is a cross-sectional view taken along the line 4—4 of FIG. 1 and shows the flow controlling valve in the same low-speed, low-load position as FIG. 1.

However, when the engine is operating at a low speed and low load, then the control valve 63 is rotated to the position shown in FIGS. 1 and 3, wherein its outer cylindrical surface is disposed closely adjacent the wall 66 and defines a narrow flow path 67 therepast. As a result, the flow area is diminished and the velocity of the intake charge is accelerated. Furthermore, the charge will be directed more toward the exhaust side of the valve seats 29 and 31 and hence, the tumble action will be further augmented.

A control pulley 68 is affixed to the outer end of the control shaft 63 and is operated by a suitable servomotor (not shown) so as to control the position of the control valve 63 in response to sensed engine conditions. Although a variety of conditions may be sensed, primarily the control valve 63 is placed in the position shown in FIGS. 1 and 4 under low-speed, low-load and in the position shown in FIGS. 2 and 5 in high-speed, high-load.

In accordance with this embodiment of the invention, only an air charge is delivered to the inlet opening 53 of the cylinder head intake passage 52, and this is supplied through an intake manifold, indicated generally by the reference numeral 69, and which may gather atmospheric air in any suitable manner. A throttle valve (not shown) may be provided at the upstream end of the manifold 69 to control engine speed.

In order to provide fuel, a charge former in the form of a fuel injector 71 is mounted so as to have its nozzle portion discharging through a port 72 in the cylinder head 24 into the flow passage 52 in registry with the control valve 63. As may be seen, the port 72 is disposed so as to be above and clear of the control valve element 63 in either the open or closed positions. As will be discussed later, other arrangements are possible for the positioning of the charge former.

Figure 6:
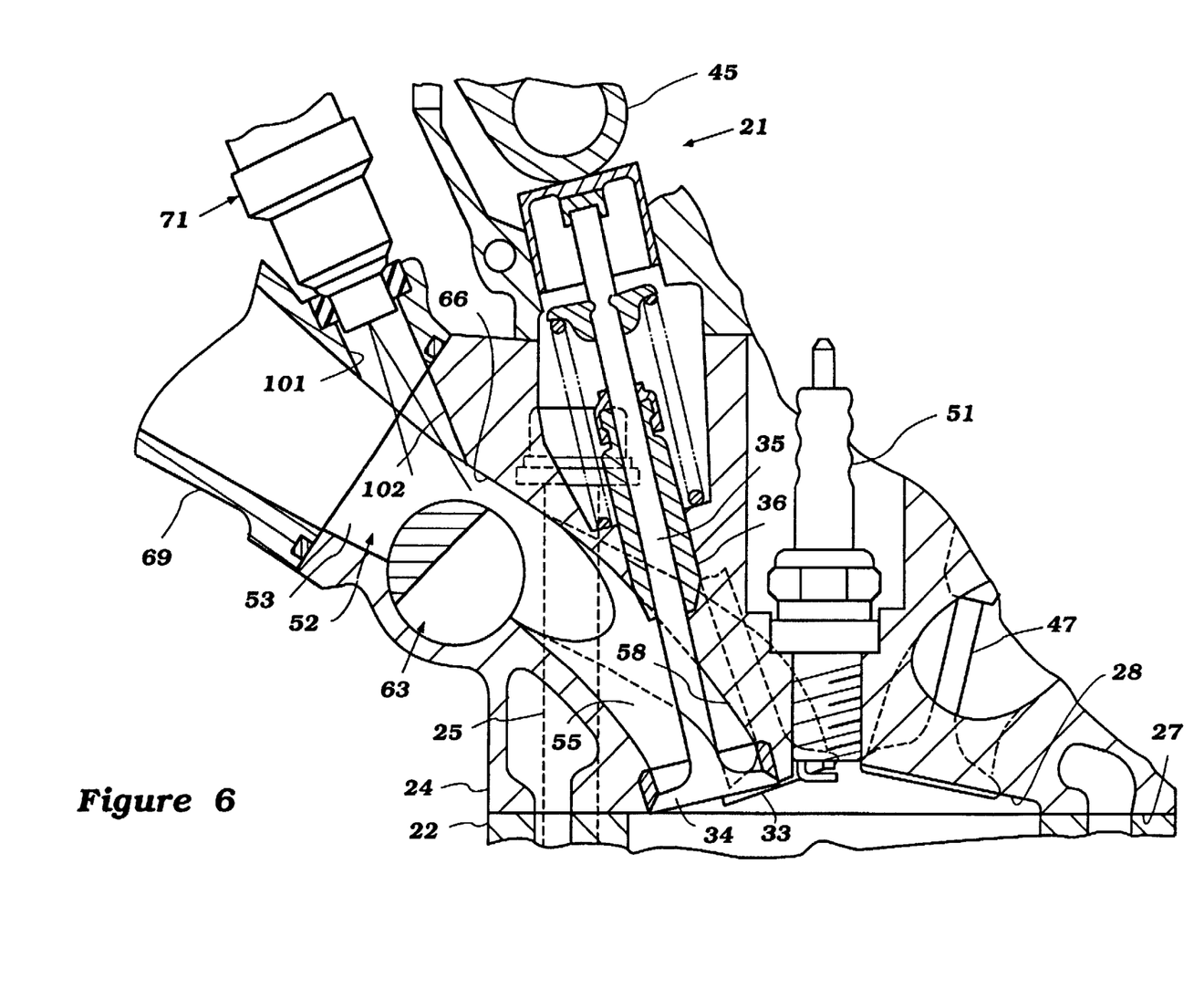
FIG. 6 is a cross-sectional view, in part similar to FIG. 1, and shows another embodiment of the invention.

Such an alternative location is shown in FIG. 6, wherein the fuel injector, still indicated generally by the reference numeral 71, is mounted into a port opening 101 that is formed in the intake manifold 69 at a position to register with a further opening 102 formed in the cylinder head 24 adjacent the opening 53 of the intake passage 52. In this location, some fuel may impinge on the control valve 63 when it is in its closed position, but this fuel will be swept by the high velocity charge into the combustion chamber recesses 28.

Figure 7:
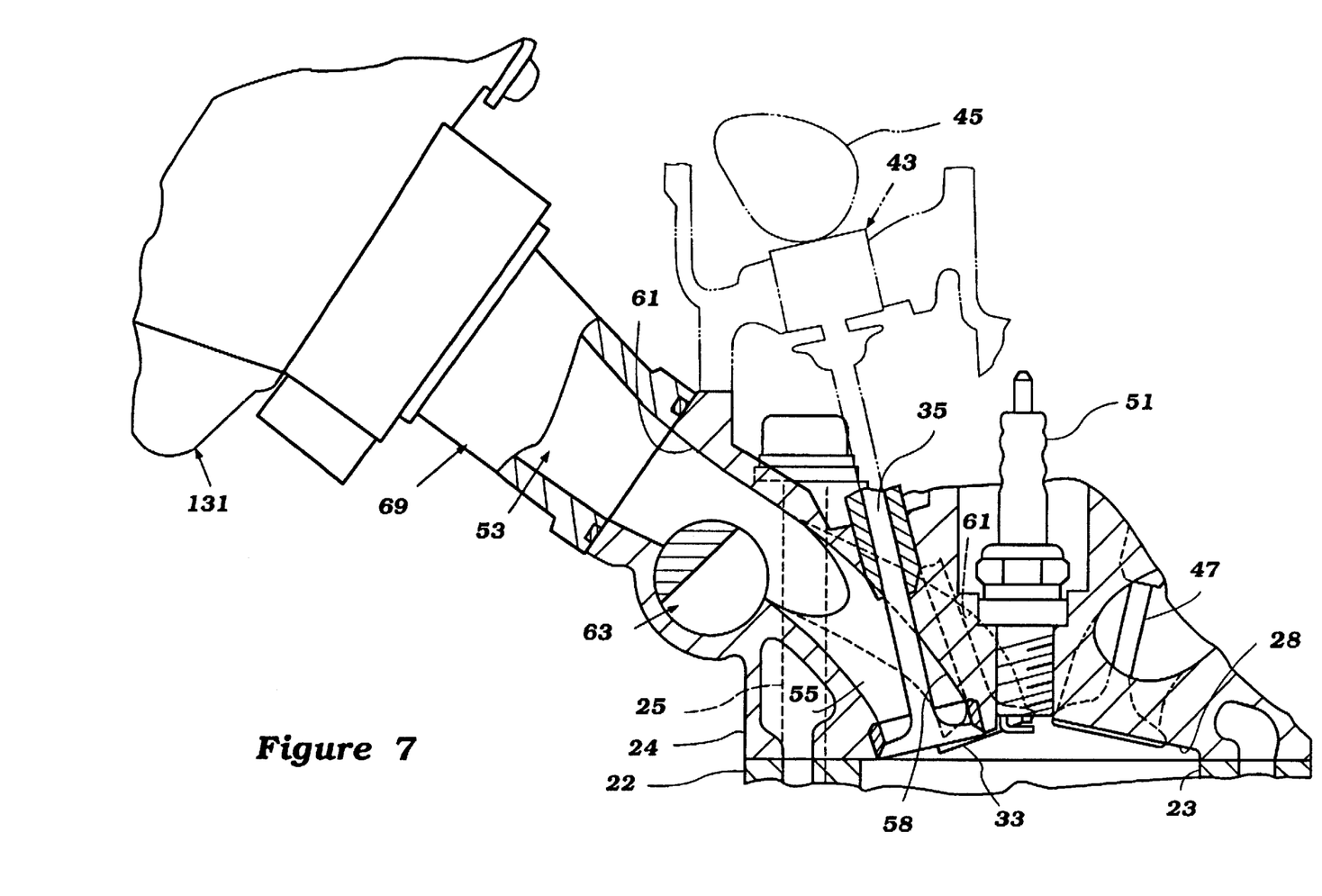
FIG. 7 is a cross-sectional view, in part similar to FIGS. 1 and 6, and shows a further embodiment of the invention.

FIG. 7 shows another charge forming arrangement, wherein the manifold 69 is served by one or more carburetors, indicated generally by the reference numeral 131. Again, this embodiment will function as those previously described and will ensure the desired degree or turbulence and flow direction under all running conditions without significantly or adversely affecting the volumetric efficiency and power output of the engine.

Figure 8:
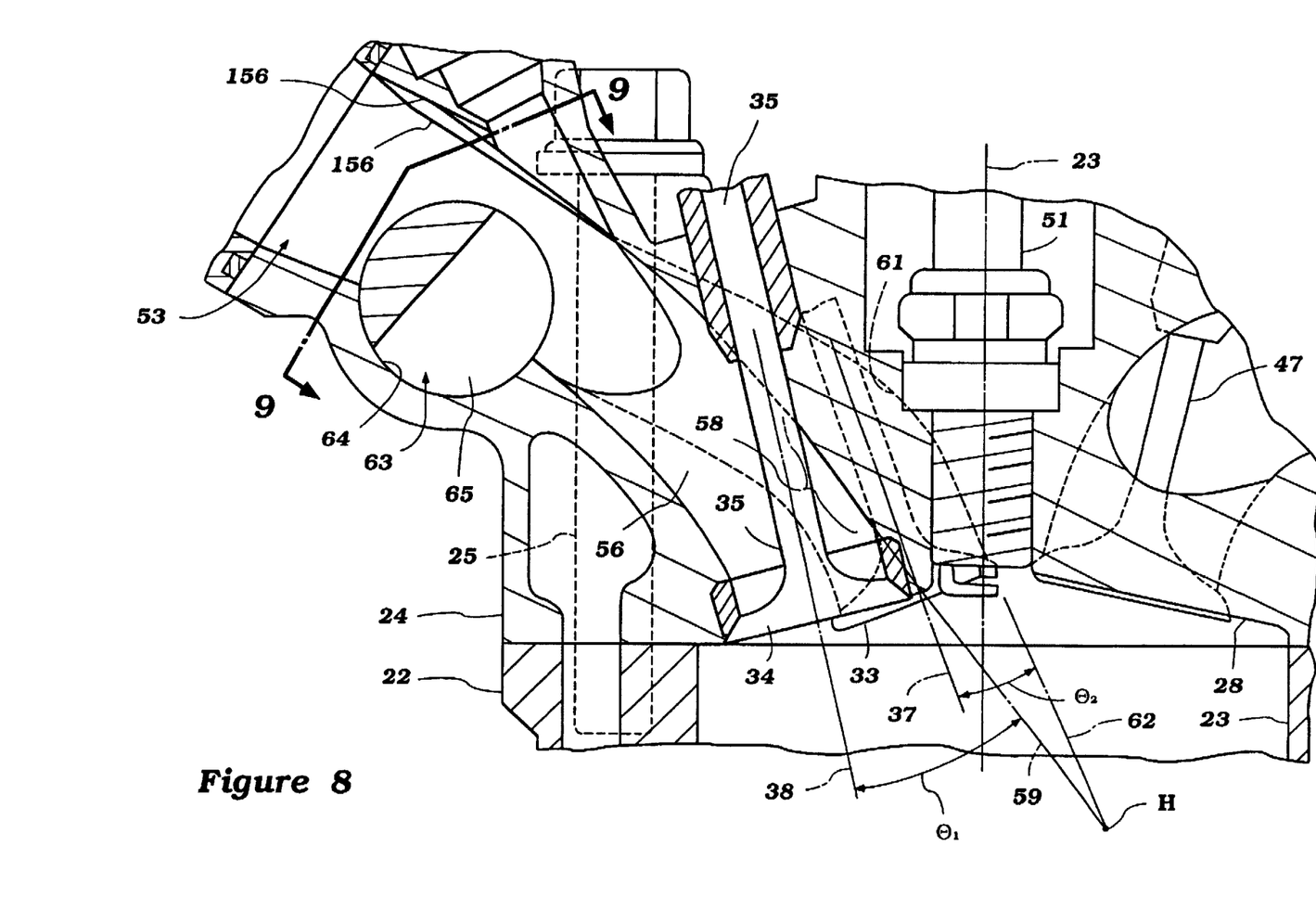
FIG. 8 is an enlarged cross-sectional view, in part similar to FIG. 2, and in the same plane as FIGS. 1, 6, and 7 and shows a still further embodiment of the invention.
Figure 9:
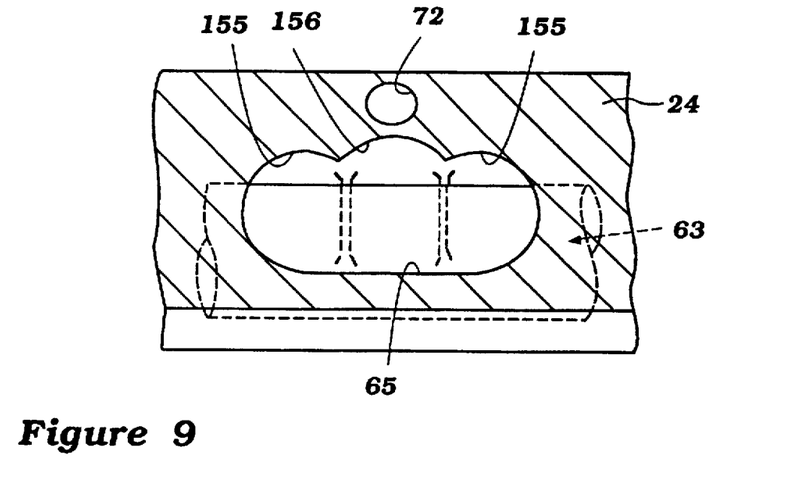
FIG. 9 is a cross-sectional view taken along the line 9—9 of FIG. 8 and shows the flow controlling valve of this embodiment in a similar position to the showing of FIG. 4.

In the embodiments of the invention as thus far described, when the control valve 63 is in its low-speed, low-load flow redirecting and restricting position, the flow area available to each of the intake passage portions 55 and 56 was substantially the same. Since the side intake valve seats 29 are closer to the plane 26 than the center seat 31, this might tend to cause a greater tumble action on the sides of the combustion chamber than at the center. In order to promote a more equal flow volume and more uniform flow without changing the shape of the control valve 63, it is possible, as shown in FIGS. 8 and 9, to form upper curved portions 151 for the side intake passage portions 55, which have a smaller flow area than that provided by a curved recess 156 for the center intake valve flow portion 56. As a result of this, there will be a larger of volume of flow through the recess adjacent the recess 156 than the recesses 155 and hence, the tumble action will tend to be more uniform across the cylinder or, in fact, higher at the center.

Figure 10:
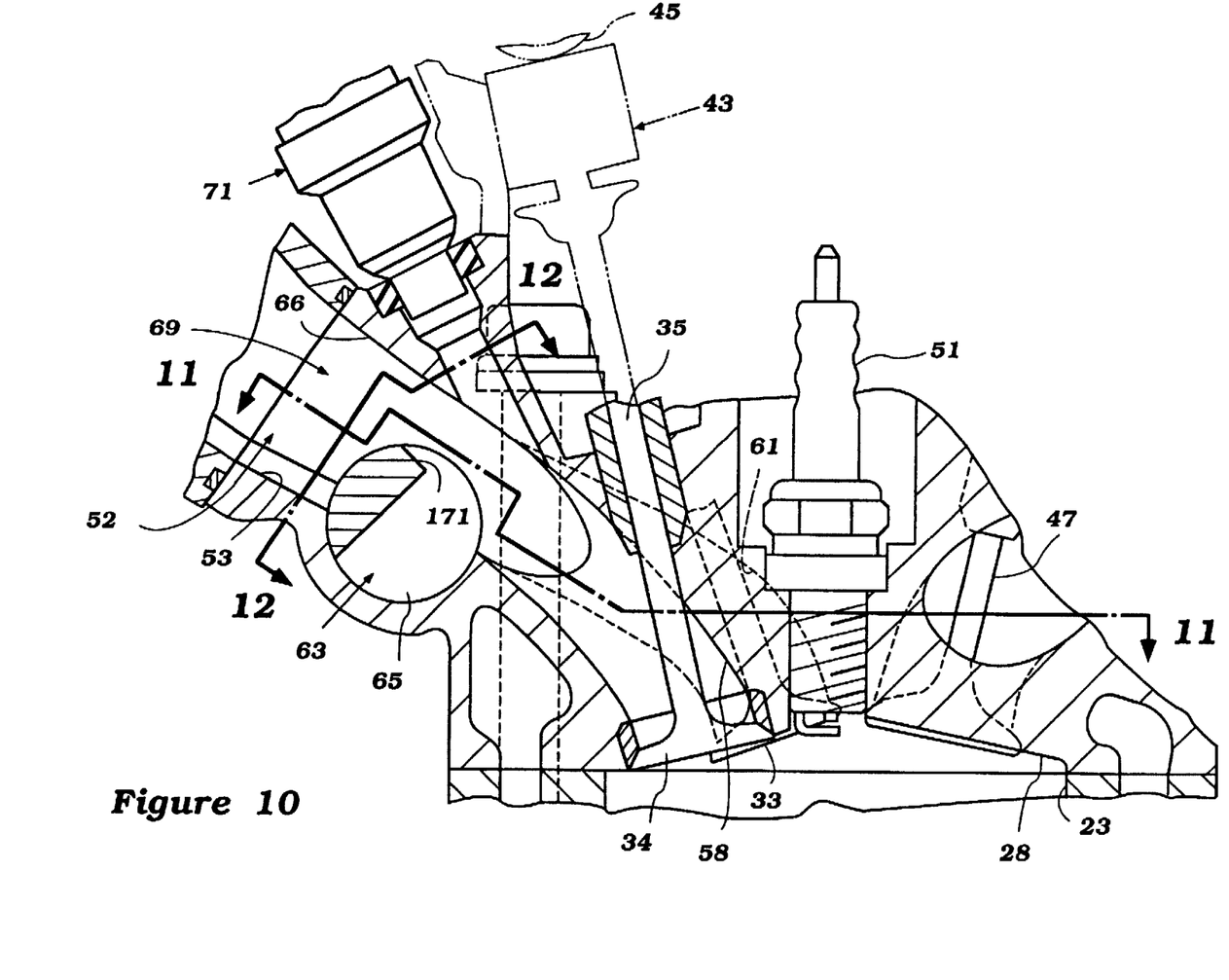
FIG. 10 is a cross-sectional view, in part similar to FIGS. 1, 6, 7, and 8, on a smaller scale than this figure, and shows yet another embodiment of the invention.
Figure 11:
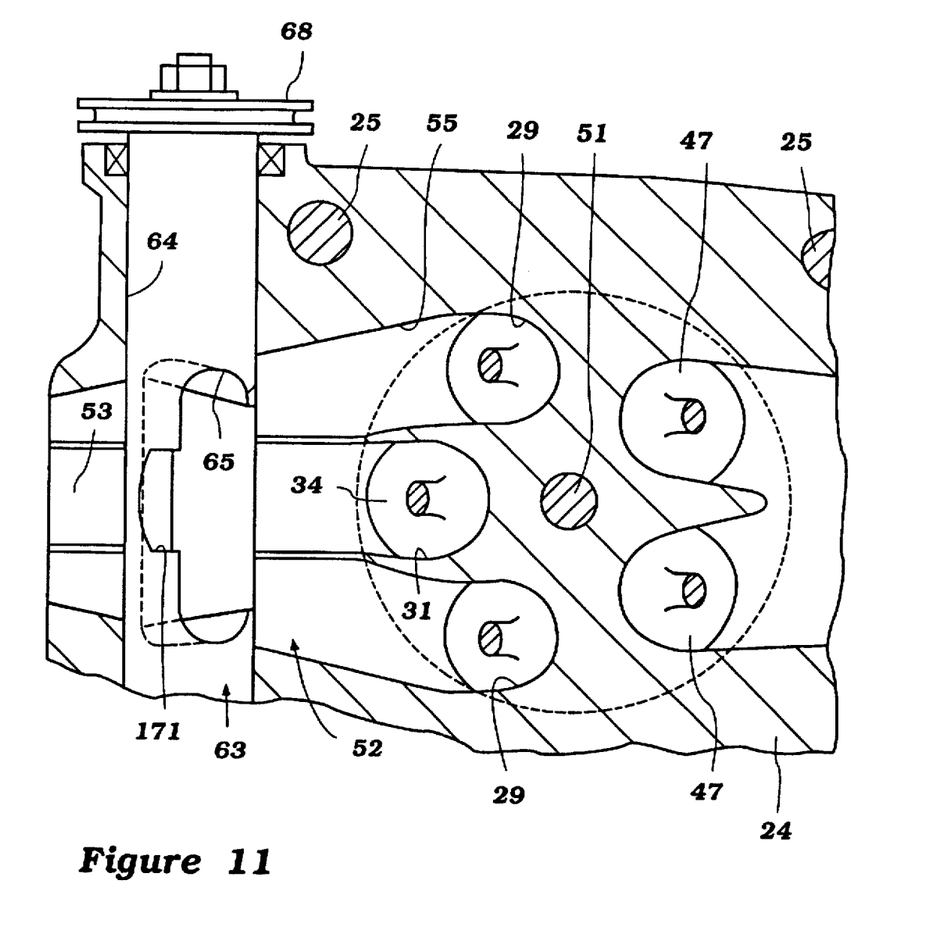
FIG. 11 is a cross-sectional view taken along the line 11—11 of FIG. 10.
Figure 12:
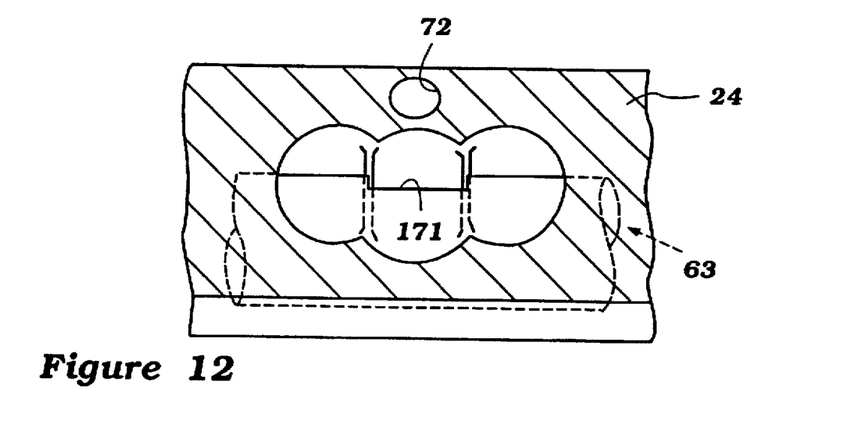
FIG. 12 is a cross-sectional view taken along the line 12—12 of FIG. 10.

FIGS. 10–12 show another embodiment that will achieve this effect in a slightly different fashion. In this embodiment, the control valve 63 is provided with a further cutout 171 which is deeper than the cutout portion 65 and hence, when the control valve 63 is in the flow controlling position, as shown in FIGS. 10 and 12, there will be a substantially greater flow area serving the center intake valve seat 31 than the side intake valve seats 29, achieving the result aforenoted.

Figure 13:
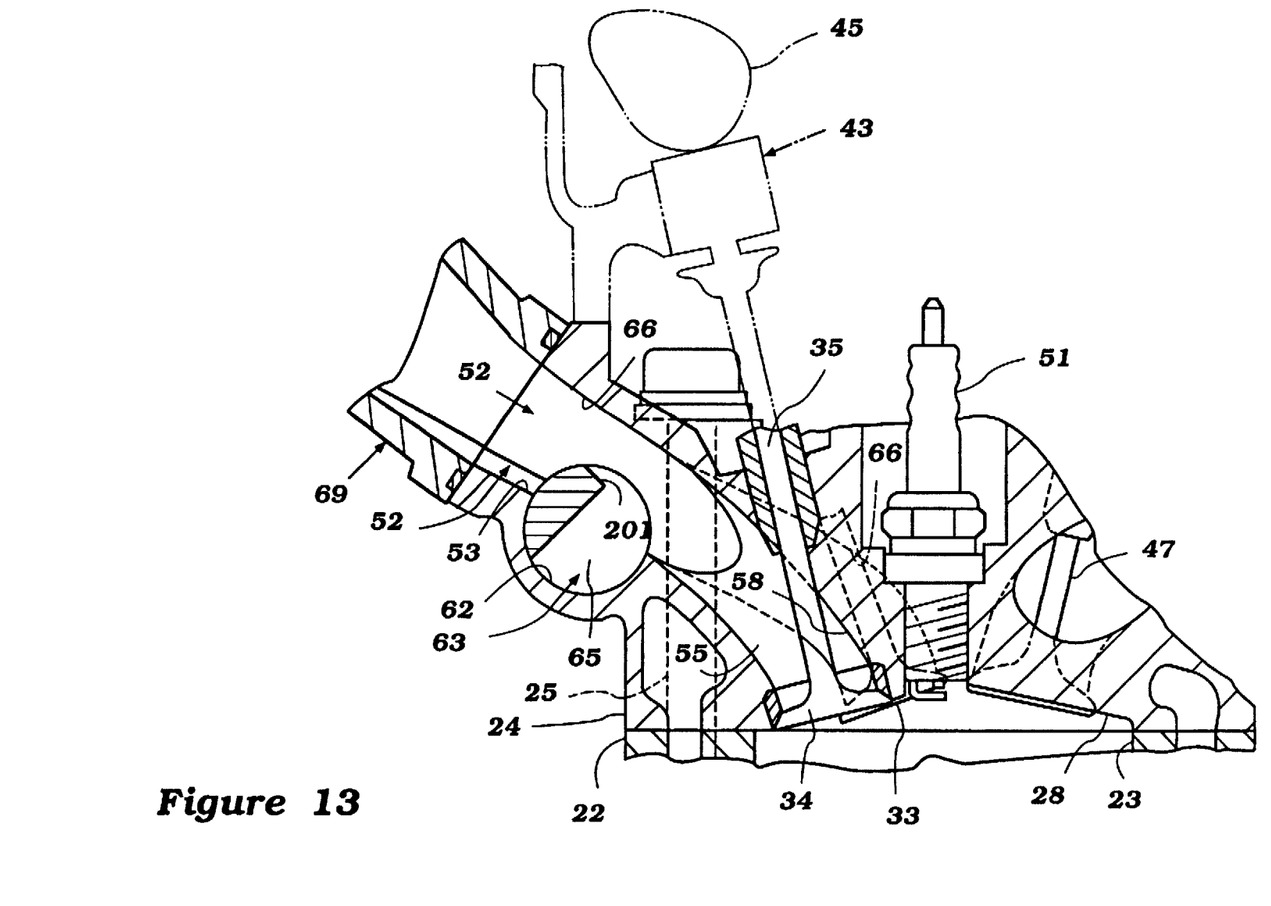
FIG. 13 is a cross-sectional view, in part similar to FIGS. 1, 6, 7, 8, and 10 of yet another embodiment of the invention.
Figure 14:
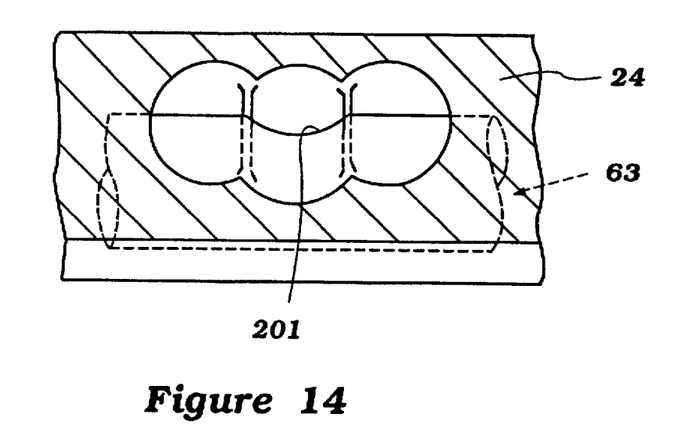
FIG. 14 is a cross-sectional view, in part similar to FIGS. 4, 9, and 12, and shows yet another embodiment of the invention.

FIGS. 13 and 14 are another embodiment which is similar to the embodiment of FIGS. 10–12. In this embodiment, however, the central cutout 201 is curved rather than straight across, so as to provide a somewhat rounded flow area for the center intake valve seat 31.

Figure 15:
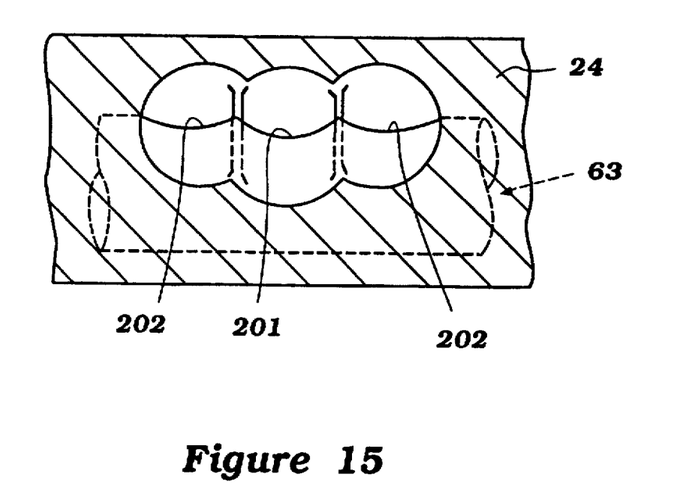
FIG. 15 is a cross-sectional view, in part similar to FIGS. 4, 9, 12, and 14, and shows a still further embodiment of the invention.
Figure 16:
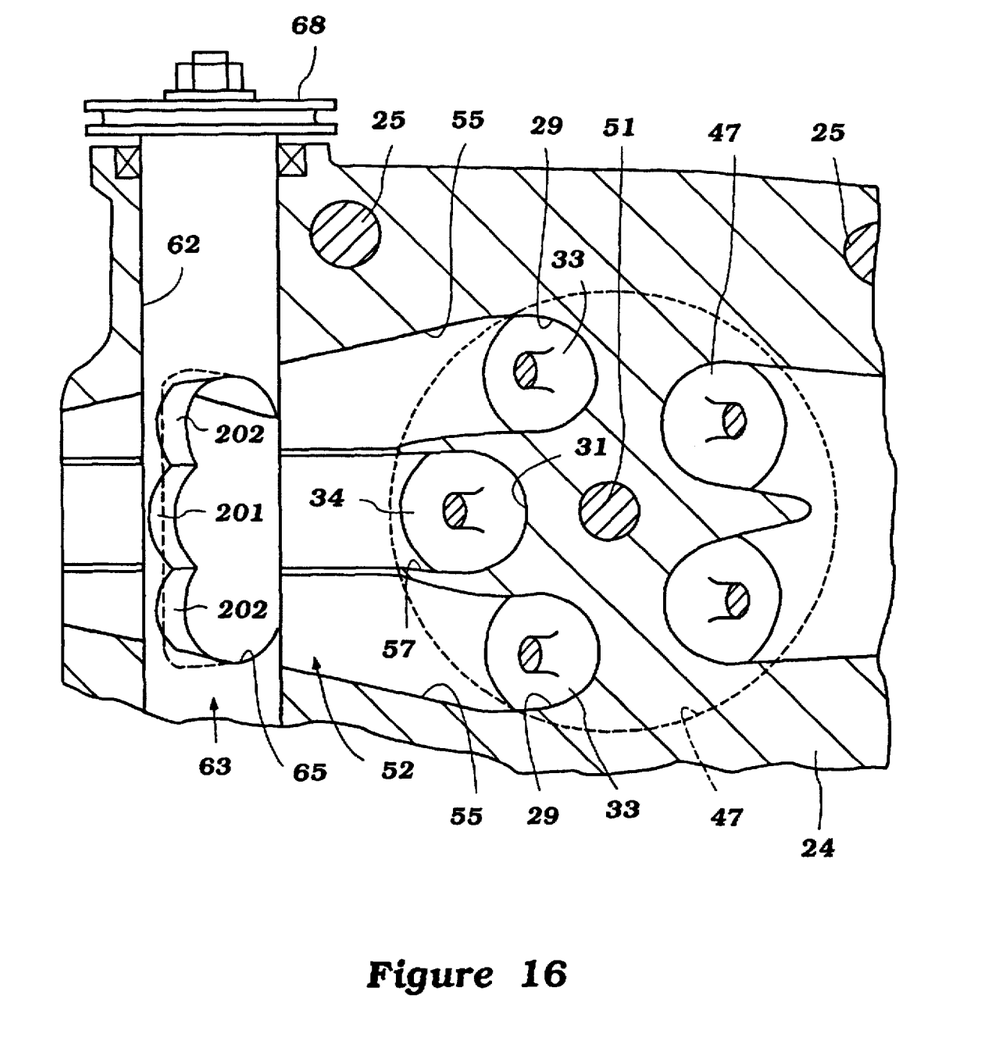
FIG. 16 is a cross-sectional view, in part similar to FIGS. 3 and 11, and shows a further embodiment of the invention.

FIGS. 15 and 16 show yet another embodiment where, in addition to the cutout 65, there is provided a curved center cutout like the cutout 201 of the previously described embodiments, but also curved cutouts 202 for the side passage portions 55.

It should be readily apparent from the foregoing description that the described embodiments of the invention provide a very effective induction system for an engine having five valves per cylinder and also which permits the generation of turbulence under low-speed, low-load conditions without adversely affecting the volumetric efficiency at high-speed, high-load conditions. Of course, the foregoing description is that of preferred embodiments of the invention, and various changes and modifications may be made without departing from the spirit and scope of the invention, as defined by the appended claims.

I claim:

1. An induction system for an internal combustion engine having a cylinder head adapted to cooperate with a cylinder block, a cylinder bore and piston therein for defining a combustion chamber, said cylinder head being formed with three intake valve seats comprised of a pair of side intake valve seats being disposed contiguous to a plane containing the axis of the cylinder bore and extending parallel to or containing the axis of rotation of a crankshaft driven by a piston in the cylinder bore and a third center intake valve seat disposed between said side intake valve seats and further from said plane, intake passage means for serving said intake valve seats, said intake passage means comprising upper wall means terminating at the respective valve seats, the upper wall portion of at least one of said side valve seats being disposed so as to lie in a second plane that intersects the combustion chamber on the side of said first plane opposite to said center intake valve seat and at a point above the head of the piston when the piston is at its bottom dead center position so as to augment the tumble motion generated to the intake charge flowing into the combustion chamber from the one side valve seat.

2. The induction system for an internal combustion engine of claim 1, wherein the upper wall portions of the intake passages serving each of the side valve seats lie in the second plane and are inclined so as to augment the tumble motion generated to the intake charge.

3. The induction system for an internal combustion engine of claim 1, wherein the upper wall portion of the intake passage serving the center valve seat lies in a third plane that intersects the second plane at a common point on the other side of the first plane and above the head of the piston at its bottom dead center position.

4. The induction system for an internal combustion engine of claim 3, further including poppet-type intake valves for controlling the flow through the respective valve seats, the poppet valve associated with the center valve seat being disposed at a first angle to the second plane, and the poppet valves of the side valve seats lying in a common fourth plane that is disposed at a second, lesser angle to the second plane than the first angle.

5. The induction system for an internal combustion engine of claim 4, wherein the upper wall portions of the intake passages serving each of the side valve seats lie in the second plane and are inclined so as to augment the tumble motion generated to the intake charge.

6. The induction system for an internal combustion engine of claim 1, further including a control valve position within the intake passage means and movable between a first position wherein the flow through the intake passage means is substantially unrestricted and a second position wherein the flow through the intake passage means is restricted and redirected through at least one of the valve seats into the combustion chamber.

7. The induction system for an internal combustion engine of claim 6, wherein the control valve is directly supported in the cylinder head.

8. The induction system for an internal combustion engine of claim 7, wherein the cylinder head is affixed to the cylinder block by fastening means disposed on the one side of the first plane and outwardly of the cylinder bore axis and wherein the control valve is disposed outwardly of the fasteners.

9. The induction system for an internal combustion engine of claim 8, further including charge forming means for delivering a charge to the combustion chamber through the intake passage means.

10. The induction system for an internal combustion engine of claim 9, wherein the charge forming means comprises a fuel injector for injecting fuel into the intake passage means downstream of the control valve.

11. The induction system for an internal combustion engine of claim 9, wherein the charge forming means delivers the fuel air charge to the intake passage means upstream of the control valve means.

12. The induction system for an internal combustion engine of claim 11, wherein the charge forming means comprises a fuel injector.

13. The induction system for an internal combustion engine of claim 6, wherein the control valve means permits more flow to the center intake valve seat than to the side intake valve seats when in its flow restricting position.

14. The induction system for an internal combustion engine of claim 13, wherein the control valve means further directs the flow toward the portion of the intake valve seats disposed closest to the plane for effecting a tumble motion therein.

15. The induction system for an internal combustion engine of claim 14, wherein the flow to all of the valve seats generates a tumble motion.

16. The induction system for an internal combustion engine of claim 15, wherein the control valve is directly supported in the cylinder head.

17. The induction system for an internal combustion engine of claim 16, wherein the cylinder head is affixed to the cylinder block by fastening means disposed on the one side of the first plane and outwardly of the cylinder bore axis and wherein the control valve is disposed outwardly of the fasteners.

18. The induction system for an internal combustion engine of claim 17, further including charge forming means for delivering a charge to the combustion chamber through the intake passage means.

19. A cylinder head assembly for an overhead valve, internal combustion engine having at least three valves, said cylinder head assembly having a surface cooperating with a respective cylinder bore formed in a cylinder block to which the cylinder head is affixed by fastening means and a piston for forming a combustion chamber, three valve seats formed in said cylinder head surface comprised of a pair of side intake valve seats disposed in substantial portion on one side of a plane containing the axis of the cylinder bore and disposed in parallel relationship to a crankshaft driven by the piston and a third center valve seat disposed further from said plane and between said side valve seats, intake passage means formed in said cylinder head and serving said valve seats, said intake passage means having a common portion, a flow control valve rotatably supported directly in said cylinder head and movable between a first position wherein flow through said intake passage means is substantially unrestricted and a second position wherein the flow through said intake passage means is restricted and redirected, said control valve means being disposed further from said plane than the fastening means lying on the same side of said plane.

20. The cylinder head assembly for an overhead valve, internal combustion engine of claim 19, wherein the control valve means is rotatably journaled within a bore formed in the cylinder head and extending substantially parallel to the plane.

* * * * *